C. S. PELTON.
HEATER FOR MOTOR DRIVEN VEHICLES.
APPLICATION FILED FEB. 5, 1916.
1,248,903.
Patented Dec. 4, 1917.
2 SHEETS—SHEET 2.
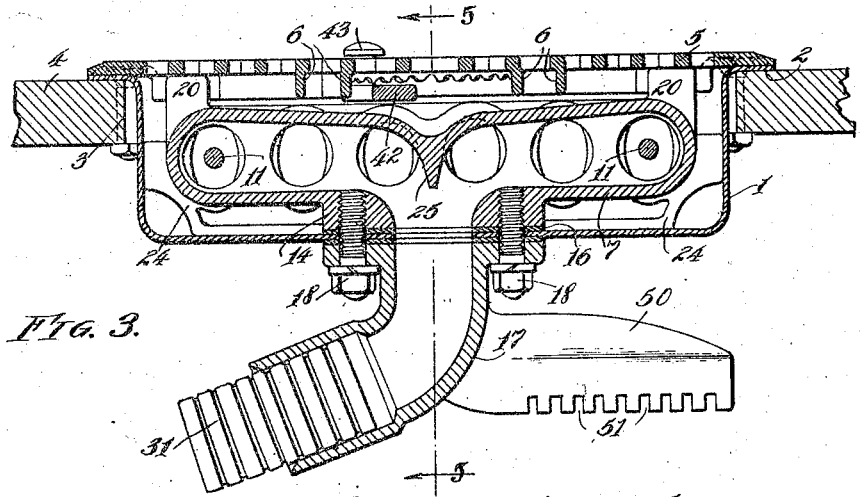//
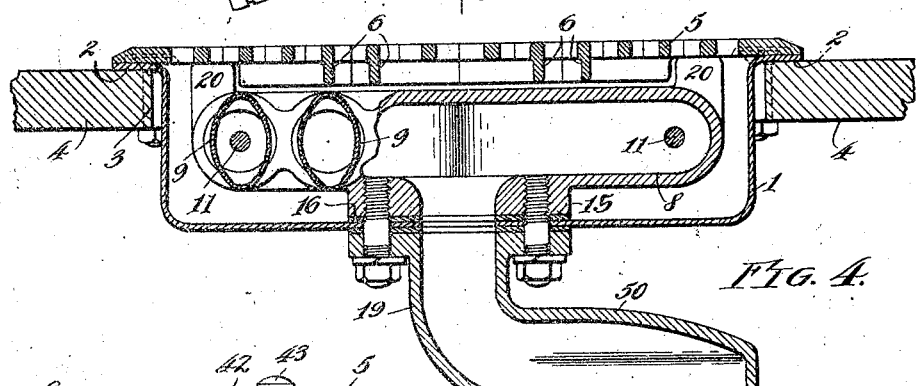
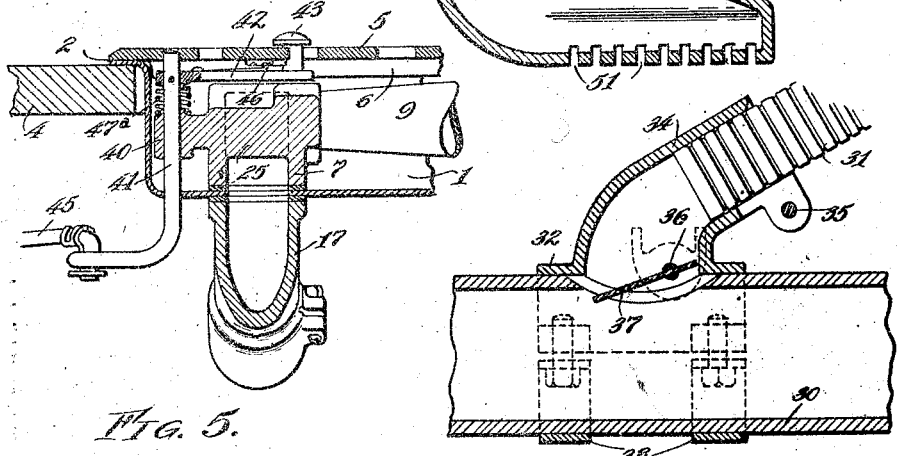
INVENTOR,
Clyde S. Pelton
By Hull Smith Brock & West
his ATTYS.

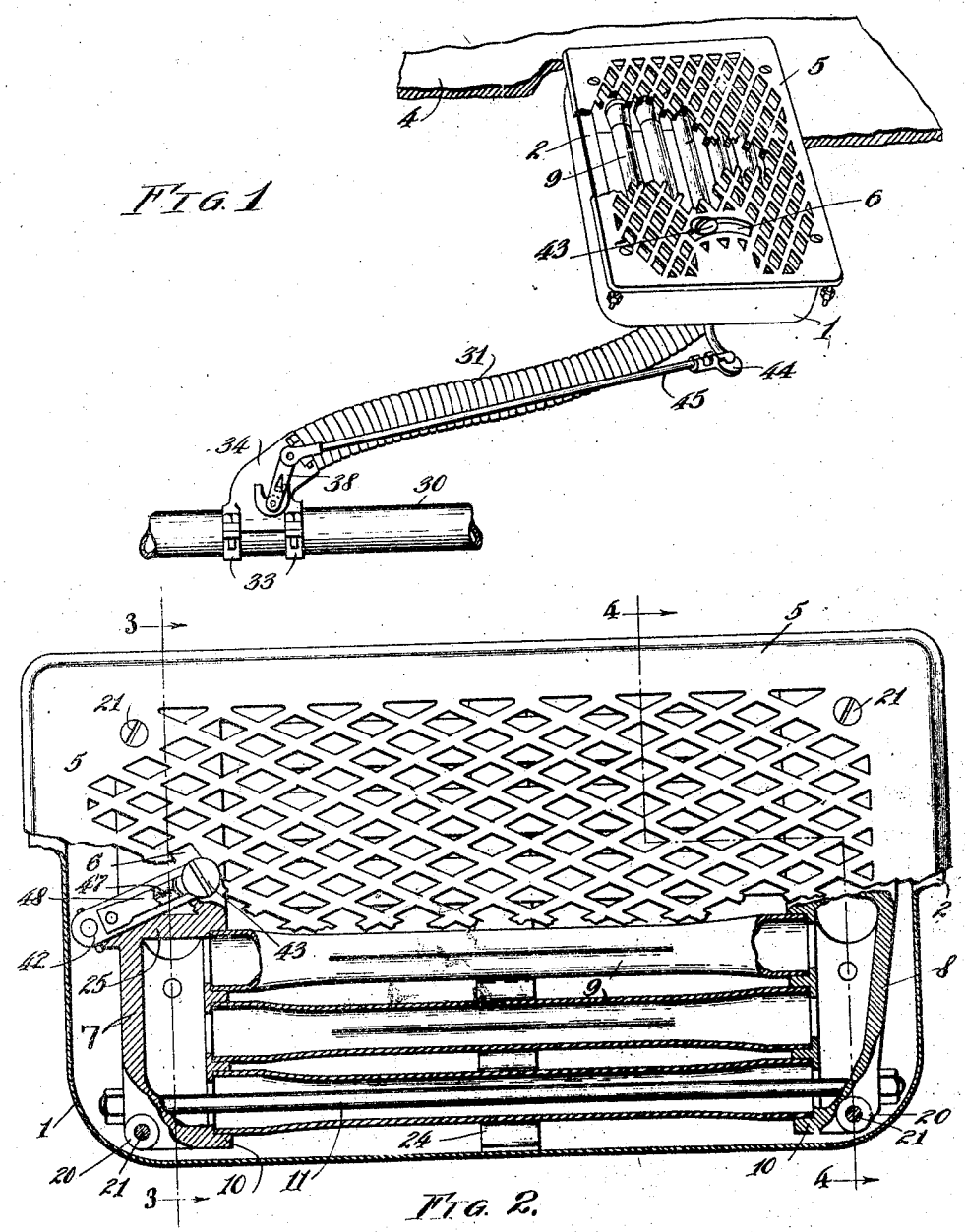

UNITED STATES PATENT OFFICE.

CLYDE S. PELTON, OF CLEVELAND HEIGHTS, OHIO, ASSIGNOR, BY MESNE ASSIGNMENTS, TO THE STANDARD PARTS COMPANY, OF CLEVELAND, OHIO, A CORPORATION OF OHIO.

HEATER FOR MOTOR-DRIVEN VEHICLES.

1,248,903.  Specification of Letters Patent.  Patented Dec. 4, 1917.

Application filed February 5, 1916. Serial No. 76,335.

*To all whom it may concern:*

Be it known that I, CLYDE S. PELTON, a citizen of the United States, residing at Cleveland Heights, in the county of Cuyahoga and State of Ohio, have invented a certain new and useful Improvement in Heaters for Motor-Driven Vehicles, of which the following is a full, clear, and exact description, reference being had to the accompanying drawings.

This invention relates to heating devices and particularly to a device to be energized by the exhaust gases of internal combustion engines such as are employed for automobiles, motorboats and other self propelled vehicles, thus keeping the occupants comfortable while utilizing only those heat units which are ordinarily wasted. While certain devices of this general purpose have been known, they have generally been heavy and cumbersome as well as of low heating efficiency, since a light construction such as will produce efficiency with cheapness has also proven noisy, both by rattling and by reason of the exhaust noises of the engine which are accentuated thereby. One of the objects of my invention is the provision of a device of light weight, low cost and high heating efficiency which shall be silent; the provision of a device of large heating area compared with its outside dimensions; the provision of a device which can be easily disassembled for removing deposited carbon; while further objects and advantages will appear as this description proceeds.

Generally speaking my invention may be defined as consisting of the combinations and constructions recited in the claims hereto annexed and illustrated in one embodiment in the drawings accompanying and forming a part of this application, wherein: Figure 1 is a diagrammatic view illustrating by improved heater as applied to an automobile, certain parts being broken away to show interior construction; Fig. 2 is a top plan view of the heater body, parts being broken away to show interior construction; Figs. 3 and 4 represent cross-sections taken on the lines 3—3 and 4—4 respectively of Fig. 2; Fig. 5 is a detail section taken upon the line 5—5 of Fig. 3; and Fig. 6 is a detail of the valve.

Describing the parts by reference characters, 1 represents a pan, preferably of pressed metal, and of substantially rectangular form having an outturned upper lip 2, said pan being for the purpose of receiving the heating element or radiator and intended to be inserted in a suitable aperture 3 formed in the floor 4 of the vehicle. To cover this pan and support the occupants of the vehicle I provide an apertured floor plate 5 which overlaps the lip 2 and is suitably secured. Preferably the lower face of the plate 5 is traversed by stiffening ribs or flanges 6—6 in order to enhance the vibration-resisting quality of the same.

Inside the pan I locate the heating element or radiator which preferably consists of a pair of oppositely disposed headers or manifolds 7, 8, connected by a plurality of heating tubes 9—9. Each of these manifolds is formed upon the side facing the opposite manifold with a plurality of circular, slightly tapered sockets 10—10, and the tubes 9 which are preferably of copper or soft brass are of such a size as to form a tight wedging engagement with the walls thereof, the headers being drawn together into engagement with these tubes by suitable bolts 11 which may conveniently traverse certain of these tubes. These tubes are preferably rather thin and it will be noted that their central portions are shown as flattened or oval, the terminal portions being left circular for engagement with the sockets. This affords the necessary air space for easy convection without unduly increasing the length of the headers 7, 8. Also the radiator can easily be taken apart for removing carbon deposit from the pipes if necessary.

This radiator is inserted in the pan 1, and the bottoms of the headers are formed with flat apertured bosses 14, 15, respectively, the faces of these bosses resting upon the bottom of the pan, with the insertion of suitable packing 16 if desired, and the openings therein registering with suitable apertures in the pan bottom. To the exterior of the pan opposite the boss 14 is applied a flanged inlet elbow 17 in such manner as to register with the opening in the header, and is drawn tightly against the pan exterior by suitable threaded means 18 engaging the boss 14, thus clamping the pan and header rigidly together. Similarly an exhaust fitting 19 is applied to the pan exterior in alinement with the boss 15 and drawn snugly thereagainst so as to clamp the pan and header against the possibility of vibration or leakage. The upper face of each header is preferably formed with upstanding bosses 20—20 adapted for the reception of screws 21 whereby the radiator may be rigidly secured to the floor plate 5, the construction being such that the floor plate will engage the lip 2 at substantially the same time. The result of this construction is to form a device of great rigidity, even with the use of thin metal and light construction, this rigidity serving to render the heater noiseless notwithstanding the intermittent exhaust from the engine, which in a structure less carefully braced is found to produce an unpleasant vibration. Heretofore this vibration has been overcome only by employing heavier metal which forms an unnecessary expense and reduces the heating efficiency of the device.

Also beneath the mid-sections of the tubes 9—9 I preferably insert a kind of bridge 24 which may be of metal or other suitable material, preferably hollow for purpose of lightness, and having notches snugly receiving the pipes, the exterior of the bridge being shaped and designed to fit snugly into the pan. In case the bridge be made of suitable shape and size I do not find it necessary to fasten it to the pan in any way, although screws or bolts can be employed for greater security. The engagement of this bridge with the thin metal tubes damps their vibrations and renders the device noticeably less noisy. I do not confine myself to this exact shape of bridge since any kind of clamp drawn upon the tubes will secure the result. Also I do not confine myself to a bridge engaging the pan, though I prefer this construction since it quiets the pan as well as the tubes. However, with pans of other constructions I am enabled to omit this feature.

The employement of headers of the type described interposes between the inlet and outlet a plurality of passageways of different lengths, which tend, by interference of sound impulses, to render the exhaust substantially silent, the variations of lengths in the number of tubes here shown being sufficient to overcome the greater part of the noise produced by engines of ordinary speed and construction. The inlet and outlet openings in the headers 7 and 8 are observed to be positioned substantially midway of the header ends and the gases are caused to enter and leave the heads at an angle of 90° to the plane of the parallel arranged tubes. I have also found good results to flow from the construction in the inlet header 7 of a depending tongue or wedge 25 projecting substantially into the inlet aperture. Just the reason for obtaining an advantage from this I cannot state, since it appears to be more than a mere splitting of the gas stream. My experience indicates that it has some effect in deadening the sound vibrations, apparently by preventing any such reverse direction of the same as should pass from one side of the radiator to the other. Such a header can also be used if desired at the outlet end, although no added advantages are produced thereby, wherefore I have shown in Fig. 4 a plain header at this point.

The inlet elbow 17 may be attached to its header in either direct or reverse position depending upon the location of the heater relatively to the engine exhaust pipe 30, and is preferably connected to said pipe by means of flexible metallic tubing 31. Attachment to the exhaust pipe is preferably effected by means of a saddle 32 clamped upon the pipe by the aid of suitable clips 33—33. Said saddle is formed with a hollow neck 34 receiving the end of the tube 31 and constricted thereon by a suitable clamping screw 35. Traversing the neck 34 tangentially of the pipe 30 is a pivoted stem 36 to which is attached a butterfly valve 37 and an operating lever 38, said valve being so arranged as either to close the passageway through the neck 34 leaving the main exhaust pipe unobstructed or when opened to project a suitable distance across the exhaust pipe and help to divert the exhaust gases into the heater. This saddle can easily be applied to existing machines by sawing a notch in the exhaust pipe and clamping the saddle thereover.

I have shown the header 7 as formed with an apertured bracket 40 receiving the pivoted stud 41. The upper end of this stud carries an operating arm 42 provided with a button 43 which projects upwardly through a suitable slot in the plate 5. The lower end of said stud is deflected laterally as at 44 for attachment to the operating rod 45 whose opposite end is articulated to the lever 38. The lower face of the plate 5 is preferably formed with an arcuate rack 46, and the upper face of the lever 42 is toothed as at 47 for coöperation therewith engagement between said tooth and rack being normally maintained by a spring 47 interposed between the arm and the bracke 40. With this construction the heat ca very readily be regulated even by those wh never before saw the device, the regulatin member being directly associated with tl heater where it would naturally be look( for, yet without danger of being damag( if stepped on. The tooth 47 is preferab carried on a spring 48 set in a recess at t upper side of the arm. This renders t engagement secure and diminishes the l bility of breakage.

The exhaust fitting may and sometir does consist merely of an elbow, but w some types of engines and with some spe a slight puffing sound is observed notwithstanding the silencing effect of the radiator. In order to overcome this I have shown the outlet fitting 19 as formed with a laterally extending hollow portion 50, one side of which is formed at increasing distances from the body of the fitting with a series of narrow transverse slots 51, which not only serve to break up and distribute the gases expelled into the atmosphere, but receive and deliver the puffs successively so that a substantial uniform discharge is produced.

While I have described my invention in detail it will be apparent that many departures from the details here set forth can be made without departing from the scope of my invention.

Having thus described my invention, what I claim is:—

1. In a heater for engine propelled vehicles, a sheet metal pan, a rigid cover plate having circulation openings, and a radiator of metal pipes located in said pan having one side rigidly attached to said cover plate and the other side rigidly attached to said pan.

2. In a heat radiator for employing the exhaust gases from an explosion engine, a pair of headers having opposed tapering sockets thin walled tubes of soft metal connecting said headers and having their ends in said sockets and tension rods bridging said headers and passing through the outer of said tubes for drawing said headers together and thereby forming a rigid structure of the radiator, each header being formed with a gas passage substantially midway of its ends and at right angles to the plane of the tubes.

3. In a heater for employing the exhaust gas from an explosion engine, a pair of headers having opposed tapering circular sockets arranged closely adjacent each other, thin metal tubes of soft metal having circular ends entering said sockets and flattened intermediate portions spaced apart to form increased air passageways, and clamping rods bridging said headers and passing through the outer of said tubes for clamping said headers and said tubes together into a rigid structure.

4. In a heater for employing the exhaust gas from an explosion engine, a pair of headers, and a plurality of parallel pipes connecting said headers, one of said headers having a single inlet opening and the other a single outlet opening, both openings being arranged substantially 90° from the plane of said pipes, and the inlet header having a transverse web or tongue projecting from the wall opposite said opening substantially to the plane of said opening.

5. In an automobile heater, a radiator adapted to be located in communication with the car body and having a downwardly facing outlet connection beneath the car, and an outlet elbow having a body portion adapted to be attached to said connection and having a laterally extending discharge portion formed with a plurality of narrow discharge apertures located at progressive distances from said body portion.

6. In a heater for utilizing the exhaust gas from an explosion engine, a pan adapted to be set in the floor of the compartment to be heated and having apertures in its bottom wall, a radiator in said pan and having apertured bosses engaging said bottom wall and their apertures registering with said first apertures, inlet and outlet fittings secured to said bosses and clamped against the bottom of said pan, the upper edge of said pan having a lip adapted to rest on the compartment floor and the upper face of said radiator having bosses, a rigid apertured floor plate adapted to engage said lip and said last bosses substantially simultaneously, and means for securing said plate to said last bosses.

7. In a heater for engine propelled vehicles, a floor support having an opening therein, a sheet metal pan carried by said support and resting in said opening, a rigid cover plate having circulation openings therein and carried by said support, and a radiator located in said pan and rigidly attached to said plate.

8. In a heater for engine propelled vehicles, a sheet metal pan adapted to be secured to the floor body, a rigid cover plate having circulation openings therein and adapted to be secured to said floor body, and a radiator located in said pan and having one side thereof rigidly fixed to the plate.

9. In a heater for engine propelled vehicles, a floor support having an opening therein, a sheet metal pan carried by said support and resting in said opening, a rigid cover plate having circulation openings therein and carried by said support, and a radiator located in said pan, said radiator being rigidly attached to both said plate and said pan, both said pan and said plate resting directly on said support.

In testimony whereof, I hereunto affix my signature.

CLYDE S. PELTON.